Dec. 23, 1952  D. R. DE BOISBLANC ET AL  2,622,442
APPARATUS FOR MEASURING LIQUID LEVELS
Filed June 10, 1949

INVENTORS.
L. M. OBERLIN
D. R. DE BOISBLANC
BY Hudson & Young
by: L. Malcolm Oberlin
ATTORNEYS Patented Dec. 23, 1952

2,622,442

UNITED STATES PATENT OFFICE 2,622,442

APPARATUS FOR MEASURING LIQUID LEVELS

Deslonde R. de Boisblanc, Bartlesville, and Lyman M. Oberlin, Dewey, Okla., assignors to Phillips Petroleum Company, a corporation of Delaware Application June 10, 1949, Serial No. 98,348

7 Claims. (Cl. 73—304)

This invention relates to apparatus for measuring liquid levels. In another aspect, it relates to such apparatus in which the liquid level is determined by variations in capacitance between a pair of spaced condenser elements, this capacitance change being produced by changes in the liquid level.

Heretofore, liquid levels have been measured by various types of sight gauges or by float-controlled indicating devices. This type of measurement is not suitable for indicating the level of liquids, such as hydrocarbons, in tank cars where severe mechanical shocks are encountered. Such devices have not proven satisfactory for indicating liquid level of hydrocarbons contained in large tanks, such as bulk storage tanks, or even in the fuel tanks of airplanes or motor vehicles. Accordingly, in tank cars, it has been customary to utilize slip tubes for measuring the liquid level. In gauges of this type, a tube is mounted for movement into and out of the liquid in the tank, this tube being vented to the atmosphere. When the inner end of the tube is immersed in the liquid, a fine spray issues from the vented end thereof whereas, when the inner end of the tube is disposed in the gas above the liquid, a distinctive white vapor issues from the vented end of the tube. By manipulating the tube, an operator can determine the liquid level within the tank by noting the slip tube position at which a change in the character of the vapor takes place. The use of slip tube gauges, however, has certain disadvantages. For example, when the tube is released for vertical movement in the liquid, the vapor pressure within the tank may expel the tube from its fitting with great velocity, which has oftentimes caused injuries to the operator of the gauge. Also, venting of gases or liquids to the atmosphere produces a fire hazard. Finally, the slip tube gauges must be mounted in a readily accessible location which is difficult to accomplish, particularly in the storage tanks of airplanes or motor vehicles.

It is an object of our invention to provide apparatus for measuring a liquid level which is free from the disadvantages encountered by prior systems.

It is a further object to provide apparatus in which the liquid whose level is to be measured constitutes a condenser dielectric whereby changes in liquid level produce representative changes in capacitance between a set of spaced condenser elements.

It is a further object to provide a level indicator which is simple in construction, reliable in operation, rugged and durable.

Various other objects, advantages and features of the invention will become apparent to those skilled in the art from a study of the accompanying disclosure and drawings, in which.

Figures 1, 2, 3, 4, 5:
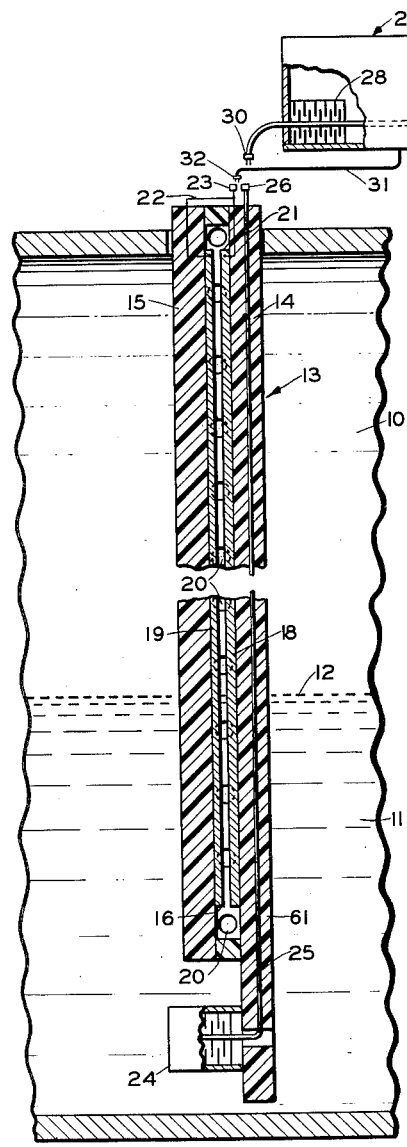
Figure 1 is a vertical sectional view of a preferred embodiment of the liquid level gauge.
Figure 2 is a schematic circuit diagram of the balancing circuit.
Figure 3 is a view illustrating the measurement of the liquid level.
Figure 4 is a vertical sectional view of a modification of the invention.
Figure 5 is a sectional view illustrating a feature of the invention.

Referring now to the drawings in detail, and particularly to Figure 1, we have shown diagrammatically a portion 10 of a tank or container which is filled with a liquid 11 to a level 12. An elongated casing or frame 13 is disposed in the tank and has its lower end immersed in the liquid 11. The casing includes a pair of flat spaced frame members 14, 15 joined by transverse frame members, one of which is shown at 16. The frame members 14, 15 carry elongated relatively narrow metal strips 18, 19, respectively, and these strips are mounted in facing closely spaced parallel arrangement. Frame member 16 is provided with openings 20 to admit liquid to the interior of the casing. Accordingly, the liquid level within the casing is always the same as the liquid level outside the casing. It will be apparent that the strips 18, 19 form a pair of spaced condenser elements, the portion of the strips below liquid level 12 having the liquid 11 as a dielectric material and the portion of the strips above liquid level 12 having air as their dielectric material. In some cases, the space above liquid level 12 may be filled with vapors from the liquid 11, but the dielectric constant of any such gases approaches one so closely that no appreciable error is introduced by assuming that the region between strips 18, 19 above the liquid level 12 is filled with air. If the liquid in the tank is conductive, the strips 18 and 19 may be coated with a thin layer of insulating material at the surfaces exposed to the liquid. In such case, the term "dielectric material" still refers to the liquid between the layers of insulating material. The upper ends of metal strips 18, 19 are connected by conductors 21, 22 to a connector socket 23.

A variable condenser 24 is mounted at the lower end of frame member 14, the stator and rotor plates of this condenser being completely immersed in the liquid 11 so that this liquid constitutes the entire dielectric material of the condenser. The shaft of variable condenser 24 is connected by a flexible coupling 25 to a socket 26 at the top of the casing while the rotor and stator of the condenser are connected by leads, not shown, to the socket 23.

The device also includes a control unit 27 which carries an air dielectric variable condenser 28, one end of the condenser shaft being connected to a control knob 29 and the other end of the control shaft being connected by a flexible coupling 30 to plug which is adapted to fit into socket 26. Control unit 27 also has a cable 31 extending therefrom which terminates in a plug 32 mating with socket 23. The unit 27 also contains the circuit components shown by Figure 2 which are connected in an alternating current bridge circuit, as illustrated.

The bridge components include an alternating current source 33, a switch 34, a galvanometer 35, and balancing resistors 36 and 37. Variable condensers 24, 28 are connected in parallel in one arm of the bridge circuit, and the capacitance between condenser elements 18, 19 of Figure 1 is represented by a variable condenser connected in another arm of the bridge circuit.

When the liquid level is below the lower end of metal plates 18 and 19, the capacitance between the plates may be represented by $1 \cdot L \cdot A$ where 1 is the dielectric constant of the air or other gas between the plates, L is the length of the plates, and A is a factor representing the cross sectional area and spacing of the plates. When the plates are completely immersed in liquid 11, the capacitance between the plates may be represented as $K \cdot L \cdot A$ where K is the dielectric constant of liquid 11. As the liquid level varies, the capacitance between elements 18, 19 varies in a linear manner between the two extreme values, LA and KLA, just mentioned. Thus, referring to Figure 3, where the liquid is at a depth D relative to the lower end of the strips 18, 19, the capacitance between plates 18, 19 is:

$$C = A[KD + (L-D)1]$$

Variable condensers 24, 28 are connected so that movement of the control knob 29 produces an increase in capacitance of one condenser and a decrease in capacitance of the other condenser. In accordance with the invention, the capacitance of these condensers is so adjusted that their total capacitance, when connected in parallel, varies in the same manner as the capacitance between elements 18 and 19 upon rotation of control knob 29. Thus, at an angular position $\theta_1$, condenser 24 has a maximum capacitance equal to KLA and condenser 28 has a minimum capacitance which is negligible. At a second angular position $\theta_2$, condenser 28 has a maximum capacitance equal to LA while condenser 24 has a minimum capacitance of negligible proportions. Thus, these two settings of the condensers provide capacitances which correspond to the capacitances between elements 18, 19 when the region therebetween is filled with liquid and empty, respectively. As the setting of the condensers is varied, the total capacitance varies in a linear manner, similar to the linear variation produced by a change in the liquid level between condenser elements 18 and 19. At an angular shaft position $\theta$ degrees from position $\theta_2$, the capacitance of the dual condenser unit may be expressed as follows:

$$C = A[K\theta + (\theta_2 - \theta_1 - \theta)]$$

It will be noted that the angle $(\theta_2 - \theta_1)$ corresponds to the length L of plates 18, 19 while $\theta$, the angle of shaft rotation, corresponds to the term D in the previous relationship. That is, when the capacitance of unit 18, 19 is equal to the capacitance of unit 24 and 28, $\theta$, the angle of shaft rotation, is directly proportional to the liquid level in the tank. Accordingly, with the circuit components connected as shown in Figure 2, when condensers 24, 28 are adjusted by movement of knob 29 so as to produce balance of the bridge, the capacitance of condensers 24, 28 becomes equal to the capacitance of unit 18, 19 with the result that the position of knob 29 gives a direct indication of the depth of liquid in the tank or container 10.

It is an important feature of the invention that the accuracy of the level indication is not affected by the dielectric constant of the liquid in the tank. This will be apparent from the fact that the angle $\theta$ is equal to the depth D in the aforesaid relationships despite large variations in the value of K, the dielectric constant. That is, condenser 24 compensates for variations in dielectric constant caused by the use of liquids having different dielectric constants in the tank at which the measurement is to be taken. The dielectric constants of liquids stored at various times in a particular tank may vary widely. For example, propane has a dielectric constant of about 2 whereas liquids such as benzene have a much higher dielectric constant in the negihborhood of 12. Accordingly, balancing condenser 24 is very important in that accurate readings may be obtained despite the use of liquids of widely differing dielectric constant in the same storage tank.

It will be further noted that the function of the bridge circuit is to compare the capacitance of elements 18, 19 with the combined capacitance of variable condensers 24 and 28. Although both these units in the present example have a linear relationship, in one case between liquid level and capacitance, and in the other case between angle of shaft rotation and capacitance, it is not essential that the relationship be linear, although such relationship is preferred for simplicity. It will be apparent that the control unit 27 is secured to the casing 13 by plugs 30, 32 when a measurement is taken and that the control unit may be readily detached after the measurement is completed. This is very advantageous in that a single control unit may be utilized to take measurements at a number of storage tanks and the delicate galvanometer and other components in control unit 27 are not subjected to shock and vibration which may be encountered by the casing unit 13, particularly when the casing is mounted in a tank on a railroad car, motor vehicle, or airplane. The casing 13, which is preferably a permanent part of the container, is of very rugged construction and easily withstands shock and vibration.

The accuracy of the results obtained may be increased, if desired, by connecting two condensers 38, 39 in parallel with the unit 18, 19. Condenser 38 is immersed in the liquid whose level is to be measured, and its capacitance is equal to the residual capacity of condenser 24, that is, the capacity between the plates of condenser 24 when it is in its position of minimum capacitance. Condenser 39 has an air dielectric, and its capacity is equal to the residual capacity of condenser 28. The use of these condensers eliminates the small error introduced by assuming that the residual capacity of units 24, 28 is negligible.

A modified form of the invention is shown by Figure 4 in which a casing 42 is formed by elongated supports 43, 44 together with two transverse supports, one of which is shown at 45, this latter support being provided with openings 46. The casing contains a set 47, 48 and a set 49, 50 of elongated narrow metal strips, the strips of each set being mounted in facing, closely spaced, parallel relationship. The two sets of strips are preferably of the same length although this is not essential for proper functioning of the apparatus. The casing 42 is supported in the liquid whose depth is to be measured by a rod 52 attached by bolts 53 to the top of the casing. Rod 52 has a graduated scale 54 formed thereon so that the depth of the casing in the tank may be readily noted.

In operation of the modification of Figure 4, condenser unit 47, 48 forms one arm of an alternating current bridge circuit, such as that shown by Figure 2, and condenser unit 49, 50 forms another arm of the bridge circuit. The unit is lowered into the liquid until the bridge circuit is balanced, at which time the capacitance of unit 47, 48 is equal to the capacitance of unit 49, 50. Accordingly, when balance is obtained, it is known that the liquid level is at the top end 55 of plates 47, 48. Thus, if this is not true, and a portion of the space between these plates is filled with air, the capacitance of condenser unit 47, 48 will be less than that of condenser unit 49, 50. Accordingly, the depth of liquid may then be read upon scale 54 to a high degree of accuracy. It will be noted that this embodiment is also independent of the dielectric constant of the liquid in the tank since the same liquid material forms the dielectric of both condenser units.

As stated, with the modification of Figure 4, the bridge circuit is balanced when the liquid level reaches point 55. If the liquid level is lower, it is difficult to obtain accurate readings although the bridge circuit may be adjusted for balance when a predetermined relationship exists between the capacitance of the condenser units, rather than when the capacitances are equal. It is, of course, impossible with the modification of Figure 4 to determine the depth if the liquid level is below plates 47 and 48. This difficulty may be overcome by utilizing the apparatus of Figure 5 in which two casing sections 57, 58 are connected by a hinge 59. Casing section 57 carries the plates 47, 48 and casing section 58 carries plates 49 and 50. The two casing sections are preferably biased to a position in which one section is perpendicular to the other by a spring 60 and plates 49, 50 are always immersed in the liquid whose depth is to be measured. With this modification, readings may be taken accurately where the liquid level is quite low, as compared with Figure 4, since the plates 47, 48 may be positioned much closer to the bottom of the tank. A similar result may be obtained with the apparatus of Figure 1 by mounting condenser 24 at a position 61 on support 14. In this fashion, the lower end of plates 18, 19 may be extended to the bottom of the tank.

It will be apparent that we have provided a liquid level indicator utilizing the dielectric constant of the liquid whose level is to be measured as a means for determining its depth. The accuracy of the reading is not affected by the dielectric constant of the liquid and no calibration thereof is required when liquids of differing dielectric constant are stored at different times in a single tank. The capacitance measuring unit is well adapted for permanent mounting in a tank and these permanently mounted parts may be made rugged and durable enough as to withstand considerable abuse in the field, a separate housing being provided for the galvanometer and other parts of the bridge circuit which is readily detachable from the parts permanently affixed to the liquid container.

While the invention has been described in connection with present, preferred embodiments thereof, it is to be understood that this description is illustrative only and is not intended to limit the invention, the scope of which is defined by the appended claims.

Having described our invention, we claim:

1. Apparatus for measuring a liquid level comprising, in combination, a pair of spaced condenser elements, the liquid whose level is to be measured constituting a portion of the condenser dielectric material, and a gas constituting the remainder of said dielectric material, whereby variations in liquid level change the relative proportions of gas and liquid dielectric material, a variable condenser having said liquid as a dielectric material, a second variable condenser having said gas as a dielectric material, said variable condensers being mechanically interconnected so that an increase in capacity of one variable condenser produces a decrease in capacity of the other variable condenser, and means for comparing the capacitance of said condenser elements with the combined capacitance of said variable condensers.

2. Apparatus for measuring a liquid level comprising, in combination, a pair of spaced condenser elements, the liquid whose level is to be measured constituting a portion of the condenser dielectric material, and a gas constituting the remainder of said dielectric material, whereby variations in liquid level change the relative proportions of gas and liquid dielectric material with a corresponding change in the capacitance between said elements, means for producing a balancing capacitance which varies in a manner corresponding to that of said condenser elements including a variable condenser having said liquid as a dielectric material, and a second variable condenser having said gas as a dielectric material, said variable condensers being mechanically interconnected so that an increase in capacity of one variable condenser produces a decrease in capacity of the other variable condenser, and means for comparing the capacitance of said condenser elements with the combined capacitance of said variable condensers.

3. Apparatus for measuring a liquid level comprising, in combination, a pair of spaced condenser elements, the liquid whose level is to be measured constituting a portion of the condenser dielectric material, and a gas constituting the remainder of said dielectric material, whereby variations in liquid level change the relative proportions of gas and liquid dielectric material with a corresponding change in the capacitance between said elements, means for producing a balancing capacitance which varies in a manner corresponding to that of said condenser elements including a variable condenser having said liquid as a dielectric material, and a second variable condenser having said gas as a dielectric material, said variable condensers being mechanically interconnected so that an increase in capacity of one variable condenser produces a decrease in capacity of the other variable condenser, the effective plate area and spacing of each variable condenser being equal to that of said condenser elements when the other variable condenser is at a position of minimum capacitance, and means for comparing the capacitance of said condenser elements with the combined capacitance of said variable condensers.

4. Apparatus in accordance with claim 3 in which the comparing means consists of an alternating current Wheatstone bridge circuit, said bridge including said spaced condenser elements as one arm thereof, and another arm of said bridge including both of said variable condensers connected in parallel circuit arrangement.

5. Apparatus for measuring a liquid level comprising, in combination, an elongated casing adapted for immersion in a container containing a liquid whose level is to be measured, a pair of elongated relatively narrow strips mounted within said casing in closely spaced parallel arrangement, said casing being perforated to allow said liquid to enter said casing, means supported by said casing for making electrical connections to the respective metal plates, a variable condenser mounted on said casing, said condenser having its stator and rotor plates immersed in said liquid, and a flexible coupling carried by said casing to move the rotor of said variable condenser.

6. Apparatus for measuring a liquid level comprising, in combination, an elongated casing adapted for immersion in a container containing a liquid whose level is to be measured, a pair of elongated relatively narrow strips mounted within said casing in closely spaced parallel arrangement, said casing being perforated to allow said liquid to enter said casing, means supported by said casing for making electrical connections to the respective metal plates, a variable condenser mounted on said casing, said condenser having its stator and rotor plates immersed in said liquid, and a flexible coupling carried by said casing to move the rotor of said variable condenser, a unit including a support, a second variable condenser mounted on said support, means for rotating said second variable condenser, a flexible cable connecting the shaft of said second condenser to the shaft of said flexible coupling so that the capacitance of one variable condenser increases as that of the other condenser is decreased, and circuit components mounted in said support and connected in an alternating current Wheatstone bridge circuit, said circuit including said spaced condenser elements as one arm thereof, and said variable condensers as another arm thereof, said variable condensers being connected in parallel circuit arrangement.

7. Apparatus for measuring a liquid level comprising, in combination, a pair of spaced condenser elements, the liquid whose level is to be measured constituting a portion of the condenser dielectric material, and a gas constituting the remainder of said dielectric material, whereby variations in liquid level change the relative proportions of gas and liquid dielectric material with a corresponding change in the capacitance between said elements, means for producing a balancing capacitance which varies in a manner corresponding to that of said condenser elements including a variable condenser having said liquid as a dielectric material, and a second variable condenser having said gas as a dielectric material, said variable condensers being mechanically interconnected so that an increase in capacity of one variable condenser produces a decrease in capacity of the other variable condenser, the effective plate area and spacing of each variable condenser being equal to that of said condenser elements when the other variable condneser is at a position of minimum capacitance, means for comparing the capacitance of said condenser elements with the combined capacitance of said variable condensers, and a pair of fixed condensers connected in parallel with said condenser elements, one fixed condenser being immersed in said liquid and having a capacitance equal to the residual capacity of said first variable condenser, the other fixed condenser being disposed in said gas and having a capacitance equal to the residual capacity of said second variable condenser.

DESLONDE R. DE BOISBLANC.
LYMAN M. OBERLIN.

REFERENCES CITED

The following references are of record in the file of this patent:

UNITED STATES PATENTS

| Number | Name | Date |
| --- | --- | --- |
| 2,357,023 | Reid et al. | Aug. 29, 1944 |
| 2,511,398 | De Giers et al. | June 13, 1950 |

FOREIGN PATENTS

| Number | Country | Date |
| --- | --- | --- |
| 441,576 | Great Britain | Jan. 22, 1936 |
| 114,980 | Sweden | Sept. 18, 1945 |